May 17, 1949.  R. E. BARRICK ET AL  2,470,128
AIRPLANE WING LEADING EDGE CONSTRUCTION
Filed Oct. 7, 1947  4 Sheets-Sheet 1
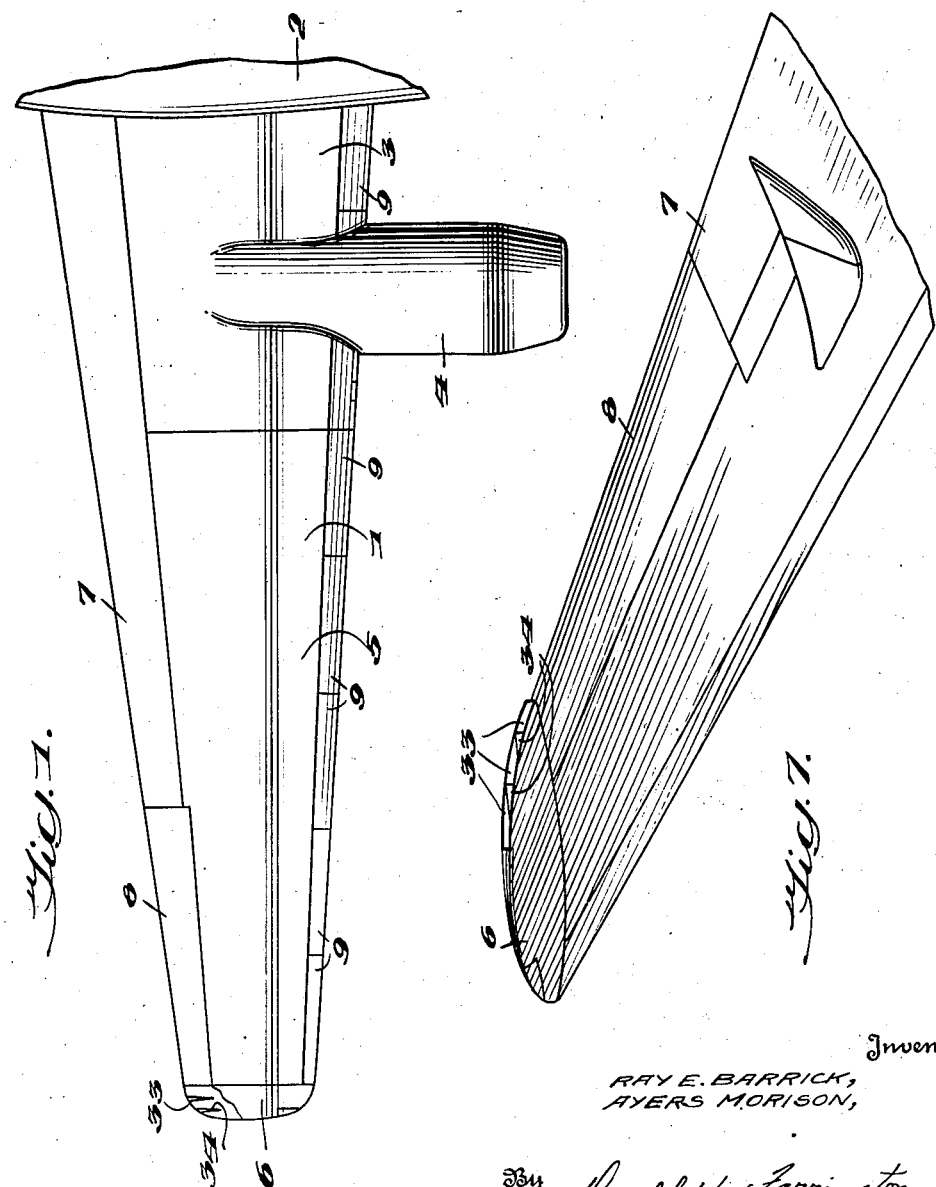
Inventors
RAY E. BARRICK,
AYERS MORISON,
By Donald W. Farrington
Attorney

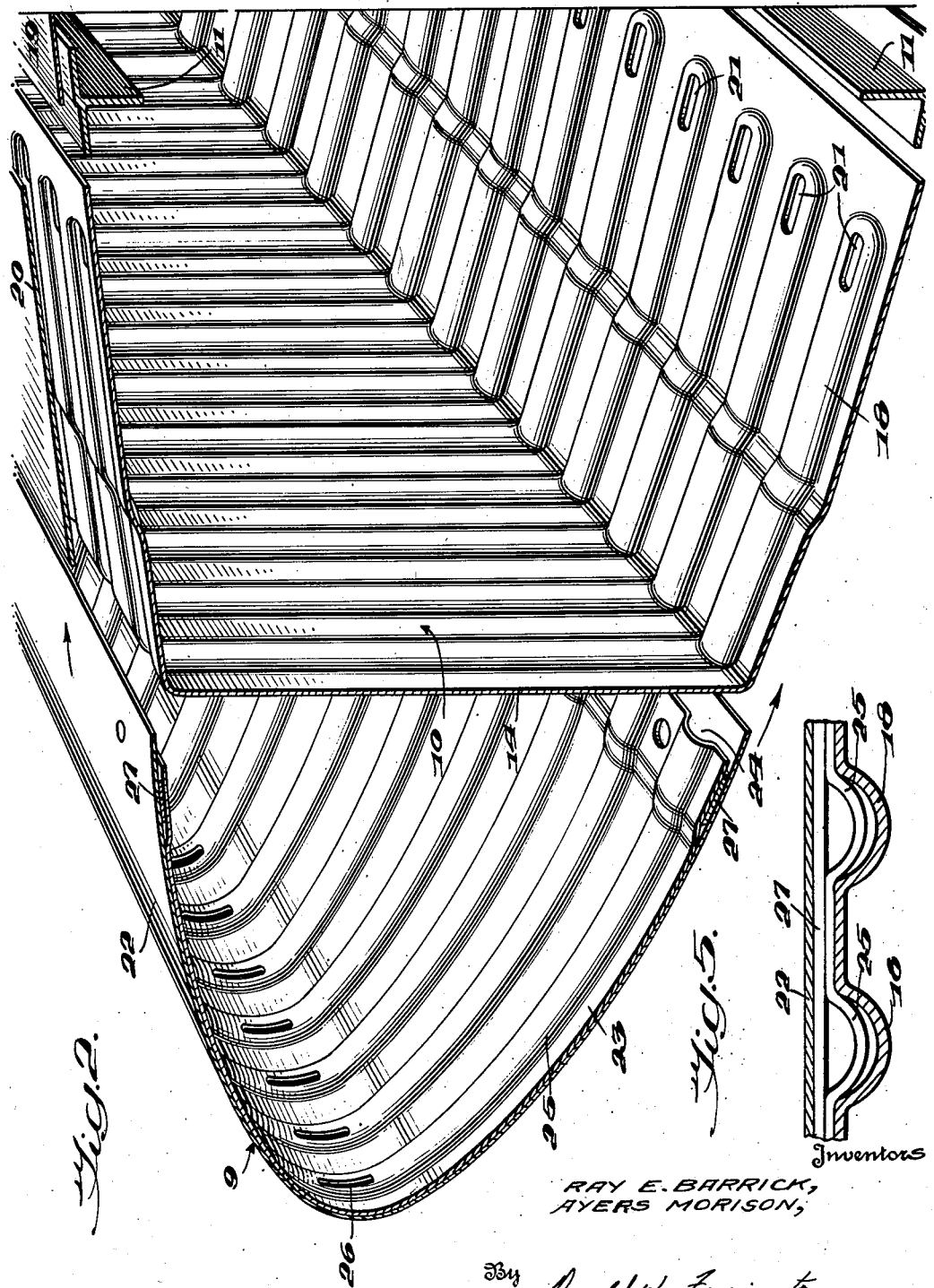

May 17, 1949.  R. E. BARRICK ET AL  2,470,128
AIRPLANE WING LEADING EDGE CONSTRUCTION
Filed Oct. 7, 1947  4 Sheets-Sheet 3
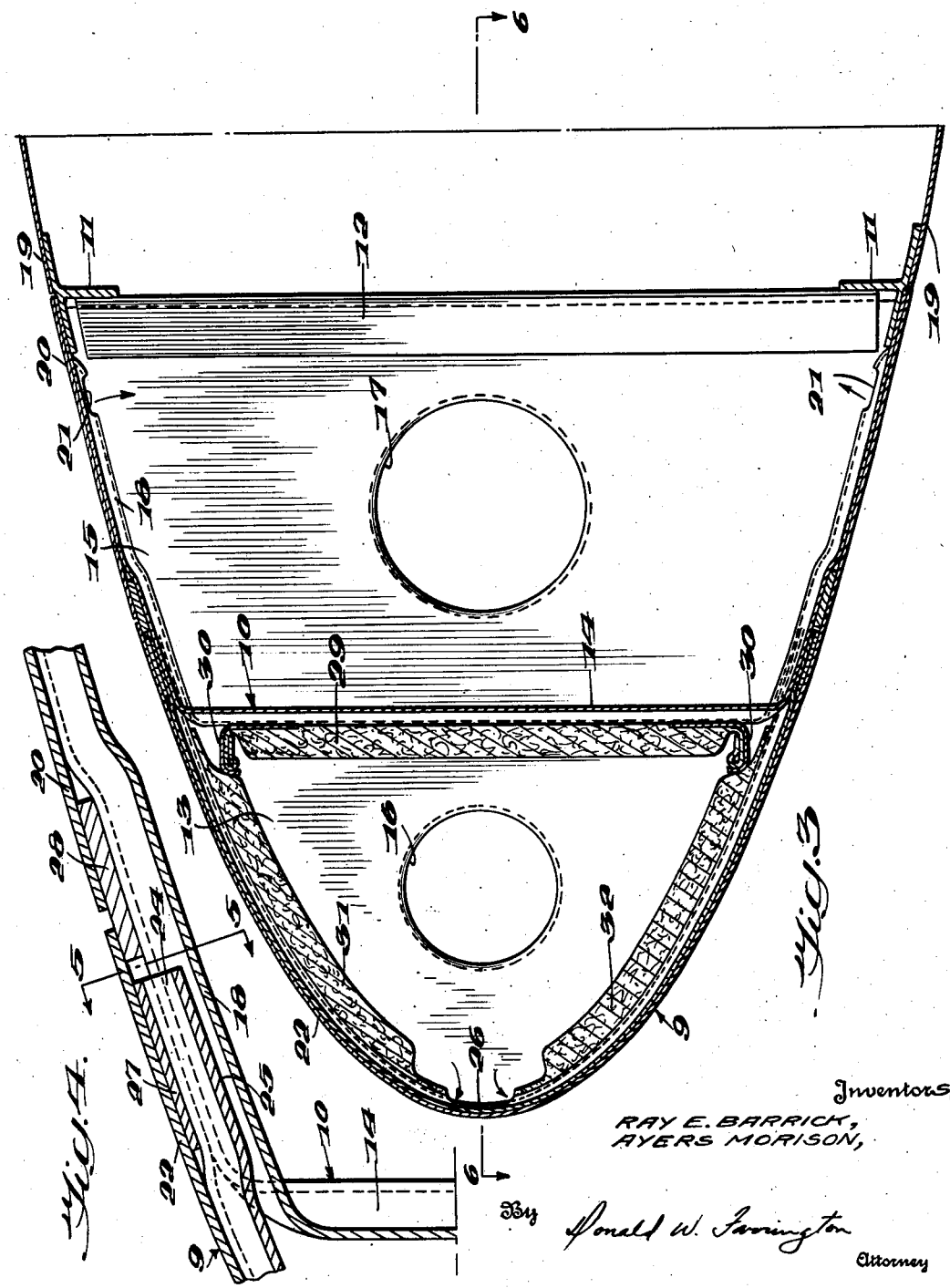
Inventors,
RAY E. BARRICK,
AYERS MORISON,
By Donald W. Farrington
Attorney May 17, 1949.   R. E. BARRICK ET AL   2,470,128
AIRPLANE WING LEADING EDGE CONSTRUCTION
Filed Oct. 7, 1947   4 Sheets-Sheet 4
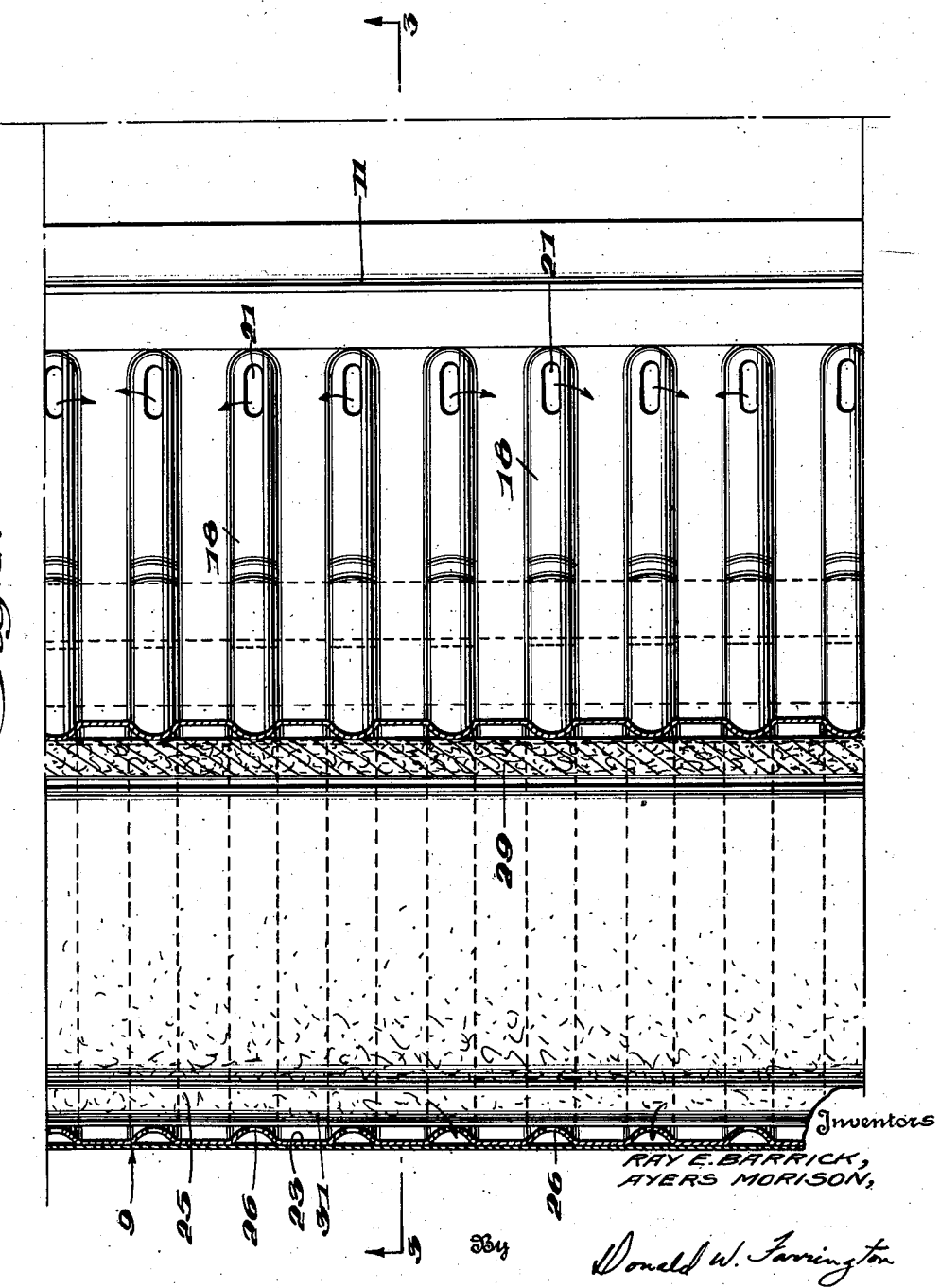
Inventors
RAY E. BARRICK,
AYERS MORISON,
Donald W. Farrington
Attorney Patented May 17, 1949

2,470,128

UNITED STATES PATENT OFFICE 2,470,128

AIRPLANE WING LEADING EDGE CONSTRUCTION

Ray E. Barrick, Baltimore, and Ayers Morison, Brooklandville, Md., assignors to The Glenn L. Martin Company, Middle River, Md., a corporation of Maryland Application October 7, 1947, Serial No. 778,406

3 Claims. (Cl. 244—134)

This invention relates to airplane wing construction, particularly that of the leading edge whereby the structure of the wing affords the advantages of excellent strength characteristics, coupled with ease of fabrication and anti-icing ducts provided by the inherent strengthening members in the leading edge structure. The disadvantages and inherent weaknesses of current anti-icing or de-icing systems for aircraft are now well known. Most of the systems in use require rubber boots attached to the external surface of the wing, which are put on in winter months and removed in summer months. Such systems cause great difficulty from the maintenance, storage and deterioration considerations, but are most objectionable in that in modern, high speed airplane wings where the contour is critical, the attaching of the boot has an undesirable effect on the aerodynamics of the wing. All such anti-icing systems add their weight 100% to the gross weight of the airplane, in that their physical structure cannot be used for anything else and, in fact, detracts from the aerodynamic characteristics of the airplane, which further reduces the pay load of the airplane.

It is an object of this invention to provide an airplane wing panel construction employing a box beam spar having great inherent strength.

It is another object of this invention to provide a reinforced, removable nose section for attachment to and cooperation with the wing panel to provide a smooth external surface and increased spar strength.

It is another object of this invention to form a wing panel having a forward spar of a box beam or channel construction which affords an exhaust duct for the hot gas employed for de-icing which is a primary load bearing member in the airplane wing construction.

It is another object of this invention to overcome current defects in de-icing systems noted above by providing an anti-icing system, the components of which are integral structural members of the leading edge of the airplane wing.

It is a further object of this invention to provide an anti-icing airplane wing leading edge construction that has no structure that must be added externally of the wing to alter the aerodynamic characteristics of the wing.

It is a further object of this invention to provide an airplane wing leading edge construction that has removable sections cooperating to form a hot gas duct along the leading edge of the wing for anti-icing purposes.

It is a further object of this invention to provide exhaust vents at the trailing edge of the wing tip to exhaust the gas used for de-icing purposes from the wing.

Further and other objects of this invention will become apparent from the description of the accompanying drawings which form a part of this disclosure and in which like numerals refer to like parts.

In the drawings:

Figure 1 is a plan view of an airplane wing embodying the invention.

Figure 2 is an exploded view of the airplane wing leading edge construction.

Figure 3 is a section taken on the line 3—3 of Figure 6.

Figure 4 is an enlarged fragmentary sectional view of the joint between the wing panel and the nose section of the wing.

Figure 5 is a fragmentary sectional view taken on the line 5—5 of Figure 4.

Figure 6 is a sectional view taken on the line 6—6 of Figure 3.

Figure 7 is a perspective view of the underside of the trailing edge of the airplane wing showing the vents in the wing tip section.

The airplane wing construction shown in the drawings illustrate the preferred embodiment of the invention.

Figure 1 of the drawings shows the wing 1 of an airplane secured to fuselage 2. The wing shown consists of an inboard panel 3 supporting the engine nacelle 4, an outboard wing panel 5, and a wing tip section 6. Flap structure 7 and aileron 8 extend along the trailing edge of the wing.

The nose portion of the wing is formed by nose sections 9 which are removably secured to wing panels 3 and 5. Nose sections 9 extend along the leading edge of the wing and form ducts for hot air for anti-icing purposes.

The leading edges of wing panels 3 and 5 are formed by box beams consisting of a corrugated channel member 10 having its sides secured to the flanges of T section 11. Member 12 is a corrugated sheet extending between the webs of the flanges of the T section for strength. Member 12 may be continuous in the area of the wing panel used for fuel storage, or in the outboard section it may be skeletonized where the web is unnecessary for a backing member or for strength. Rib portion 13 extends forward of the corrugated wall 14 of channel 10, spaced at the intersection of the adjoining edges of members 9. Rib portion 15 extends transverse of channel 10 aligned with member 13. Members 13 and 15 have holes 16 and 17 that serve as lightening holes and afford communication between the ducts formed by the box beam spar and the nose member 9 of the wing.

It will be seen then that the wing panel has a box beam spar formed by members 10, 11 and 12 extending along the leading edge of the wing panel which affords not only great strength as an airplane structural member but also provides a duct for hot gas as a part of the anti-icing system.

The particular construction of the box beam spar for the wing panel and the nose portion is best shown in detail in Figures 2 to 6. The exploded view, Figure 2, shows channel member 10 formed with corrugations 18 inwardly of the sheet on the sides of the channel. Similar corrugations are provided in wall 14 of channel 10. The channel, having transverse corrugations, provides a relatively strong member which, when attached to extrusion 11 with corrugated web 12 extending therebetween, provides a wing panel box beam spar construction of great strength. Outer skin 19 is secured to one of the flanges of the T section 11. Skin portion 20 is secured to another flange of T section 11 with the sides of channel 10 abutting skin 19 to form a continuous smooth profile over a portion of the sides of channel 10. Corrugations 18 in the sides of channel 10 afford passages when skin 20 is in place along the sides of the channel member 10. Apertures 21 formed in the ends of corrugations 18 afford communication between these passages and the interior of the box beam spar. The leading edge of the wing panel, therefore, is formed by a box beam consisting of members 10, 11 and 12. The skin section 20 affords a smooth contour over the exterior of the box beam except for the portion to which the nose section is attached and also affords passages through corrugations 18 and apertures 21 along skin 20 communicating with the interior of the box beam spar.

Nose portion 9 is assembled with the leading edge of the wing panel, to complete the airfoil profile. Skin member 22 consists of an outer, smooth sheet reinforced with a corrugated sheet 23 secured thereto to stiffen the outer skin member and to provide passages from the open ends 24 of corrugations 25 to apertures 26 located along the inside of the leading edge. Sheet 23 is formed adjacent the attaching flange to accommodate strip 27 which gives additional strength around the attaching screw openings. A similar reinforcing member 28 is employed between the outer skin 20 and the corrugated sides of channel 10 adjacent the attaching edge of the structure. This is best shown in Figure 4. This figure also shows that when the edges of nose portion 9 are put in place upon the forward portion of the wing panel, the open ends of corrugations 25 in sheet 23 nest in the corrugations 18 of the side portions of channel 10. It will be thus seen that when member 9 is in place on the leading edge of the wing panel, a continuous passage for hot gas is afforded from the interior of member 9 through apertures 26, corrugations 25, the open ends of the corrugations 24, corrugations 18 and apertures 21 to the interior of the box beam spar forming the leading edge of the wing panel.

The nesting of corrugations 25 in 18 is shown in sectional view Figure 5.

So that the temperature of the gas will be maintained at a high level uniformly along the leading edge duct, a pad of insulation material 29, preferably glass wool retained by glass cloth, is secured in brackets 30 to the outside of wall 14 of member 10. Similar insulating pads 31 and 32 are provided along the inside corrugation sheet of member 9, to insulate the duct formed by member 9 and maintain the temperature of the gas flowing therethrough. The hot gas that escapes from this duct through aperture 26 heats the skin by conduction and radiation from the passages formed by corrugations 25 and 18. The hot gas can be supplied from any conventional source, such as engine exhaust gas heat exchangers or combustion heaters.

The outboard end of the outer wing panel is completed by wing tip section 6 which is hollow and affords passage for the exhaust gas from the anti-icing system from the hollow spar or interior of the wing panel through vents 33 formed by spacers 34 between the upper and lower skins at the trailing edge of wing tip section 6.

The above described structure provides a novel airplane wing construction in which the strength of the structure is obtained by structural elements so arranged that these same elements can be used as elements of a de-icer system. The wing panel has a forward box beam spar of novel construction from which is obtained great strength. When the nose section is secured in place, the forward portion of the wing has in effect a double box beam. By insulating the nose portion and using it as a duct for hot gas, de-icing or anti-icing is effected with no additional structural elements.

It is to be understood that certain changes, alterations, modifications and substitutions can be made without departing from the spirit and scope of the appended claims.

We claim as our invention:

1. An airplane wing construction including upper and lower sheet metal skins, a channel member extending spanwise of the wing secured to said upper and lower skins with the forward edges of said skins partially overlapping the sides of said channel member, said channel member having transverse corrugations formed therein, the rear end of the corrugations in the sides of said channel having apertures formed therein affording open communication with the interior of the wing, a nose portion removably secured to said channel member including a U-shaped smooth outer skin having the edges thereof abutting the edges of said upper and lower wing skins, a corrugated under skin for said nose portion secured thereto, the open ends of the corrugations of said under skin nesting in the corrugations of the sides of said channel member, orifice means formed in the corrugations of said under skin which afford communication between the interior of the said U-shaped nose portion, through the passages formed by said corrugations, and the interior of said wing.

2. An airplane wing leading edge construction including a spar extending spanwise of the wing, a channel member having transverse corrugations, secured to the spar forming therewith a box beam, outer skin secured to the sides of said channel conforming to the airfoil profile of the portion adjacent said spar, orifice means formed in the ends of the corrugations adjacent said spar affording communication between the space intermediate the sides of said channel member and said skin attached thereto and the interior of said box beam, a U-shaped nose portion comprising a smooth outer skin, the edges of which abut said skin on said channel members to complete the airfoil contour, a corrugated reinforcing sheet secured on the inside of said smooth skin on said nose portion, the corrugations of said reinforcing sheet nesting in the corrugations of the sides of said channel member, orifice means formed in the corrugations of said reinforcing sheet affording communication between the space intermediate said smooth outer skin and said corrugated reinforcing sheet and the interior of said nose portion.

3. An airplane wing construction including upper and lower skins, a channel member having transverse corrugations extending spanwise of the wing secured to said upper and lower skins with the forward edge of said skins partially overlapping the sides of said channel member, the rear end of the corrugations on the sides of said channel formed to be in communication with the interior of the wing, a nose portion removably secured to said channel member including a U-shaped smooth outer skin having the edges thereof abutting the edges of said upper and lower wing skins, a corrugated under skin for said nose portion secured thereto, the open ends of the corrugations of said under skin nesting in the corrugations of the sides of said channel member, orifice means formed in said corrugations of said under skin which afford communication between the interior of said U-shaped nose portion, through the passages formed by said corrugations, and the interior of said wing.

RAY E. BARRICK.
AYERS MORISON.

REFERENCES CITED

The following references are of record in the file of this patent:

UNITED STATES PATENTS

| Number | Name | Date |
| --- | --- | --- |
| 1,932,681 | Smith | Oct. 31, 1933 |
| 2,046,521 | Mahaffey | July 7, 1936 |
| 2,320,870 | Johnson | June 1, 1943 |
| 2,336,194 | Shuhi | Dec. 7, 1943 |
| 2,447,095 | Schmidt | Aug. 17, 1948 |

FOREIGN PATENTS

| Number | Country | Date |
| --- | --- | --- |
| 97,141 | Sweden | Oct. 17, 1939 |